(12) United States Patent
Bugenhagen

(10) Patent No.: US 10,078,528 B2
(45) Date of Patent: Sep. 18, 2018

(54) VIRTUAL MACHINE-TO-PORT PERIPHERAL DEVICE DRIVER FOR IMPLEMENTING COMMUNICATIONS BETWEEN VIRTUAL MACHINES AND CLIENT DEVICES

(71) Applicant: CenturyLink Intellectual Property LLC, Denver, CO (US)

(72) Inventor: Michael K. Bugenhagen, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 152 days.

(21) Appl. No.: 14/983,758

(22) Filed: Dec. 30, 2015

(65) Prior Publication Data

US 2017/0097842 A1    Apr. 6, 2017

Related U.S. Application Data

(60) Provisional application No. 62/237,981, filed on Oct. 6, 2015.

(51) Int. Cl.
*G06F 9/455*    (2018.01)
*G06F 9/46*    (2006.01)
(Continued)

(52) U.S. Cl.
CPC ........ *G06F 9/45558* (2013.01); *G06F 13/102* (2013.01); *G06F 13/4072* (2013.01); *G06F 13/4282* (2013.01)

(58) Field of Classification Search
None
See application file for complete search history.

(56) References Cited

U.S. PATENT DOCUMENTS 6,577,327 B1    6/2003  Rochford et al.
8,051,382 B1    11/2011  Kingdom et al.
(Continued)

FOREIGN PATENT DOCUMENTS

EP    2017711 A2    1/2008

OTHER PUBLICATIONS

International Search Report and Written Opinion prepared by the Korean Intellectual Property Office as International Searching Authority for PCT Intl Patent App. No. PCT/US2016/044867 dated Nov. 23, 2016; 13 pages.
(Continued)

*Primary Examiner* — Bing Zhao
(74) *Attorney, Agent, or Firm* — Swanson & Bratschun, L.L.C.

(57) ABSTRACT

Novel tools and techniques might provide for implementing communications between two or more virtual machines ("VMs") and client devices coupled to one or more ports. In some embodiments, an orchestration agent running on a host computing system might configure, using a VM-to-Port driver, a physical port of the host device to establish two or more virtual ports associated with the physical port, and might map, using the VM-to-Port driver, each of two or more VMs running on the host computing system with corresponding each of the two or more virtual ports. When a client device is communicatively coupled to the physical port, the orchestration agent might map, using the VM-to-Port driver, each of the two or more VMs with one or more functions of the client device via corresponding each of the two or more virtual ports associated with the physical port to which the client device is communicatively coupled.

20 Claims, 10 Drawing Sheets

(51) Int. Cl.
  *G06F 12/00* (2006.01)
  *G06F 13/42* (2006.01)
  *G06F 3/00* (2006.01)
  *G06F 13/10* (2006.01)
  *G06F 13/40* (2006.01)

(56) References Cited

U.S. PATENT DOCUMENTS

| | | | |
|---|---|---|---|
| 8,645,605 B2* | 2/2014 | Subramaniyan | G06F 13/105 710/104 |
| 2006/0195675 A1* | 8/2006 | Arndt | G06F 9/45537 711/200 |
| 2009/0204965 A1 | 8/2009 | Tanaka et al. | |
| 2010/0306763 A1 | 12/2010 | Lambert et al. | |
| 2012/0307684 A1 | 12/2012 | Biswas et al. | |
| 2013/0061297 A1 | 3/2013 | Larsen et al. | |
| 2013/0204971 A1 | 8/2013 | Brandwine et al. | |
| 2015/0143368 A1 | 5/2015 | Bugenhagen | |
| 2016/0006696 A1 | 1/2016 | Donley et al. | |
| 2016/0292007 A1* | 10/2016 | Ding | G06F 9/5011 |

OTHER PUBLICATIONS

International Search Report and Written Opinion prepared by the Korean Intellectual Property Office as International Searching Authority for PCT Intl Patent App. No. PCT/US2016/055293 dated Jan. 11, 2017; 12 pages.
LightReading (Mar. 17, 2015). "RAD Launches vCPE Platform for Hosting VNFs." Web Site www.lightreading.com/nfv/nfv-elements/rad-launches-vcpeplatform-for-hosting-vnfs. Accessed Sep. 8, 2015, 1 page.
Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
International Preliminary Report on Patentability for PCT Intl Patent App. No. PCT/US2016/055293 dated Apr. 19, 2018; 9 pages.

* cited by examiner

VIRTUAL MACHINE-TO-PORT PERIPHERAL DEVICE DRIVER FOR IMPLEMENTING COMMUNICATIONS BETWEEN VIRTUAL MACHINES AND CLIENT DEVICES

CROSS-REFERENCES TO RELATED APPLICATIONS

This application claims priority to U.S. patent application Ser. No. 62/237,981 (the "'981 application"), filed Oct. 6, 2015 by Michael K. Bugenhagen, entitled, "NFV Peripheral Network Driver for VNF's."

This application may be related to U.S. patent application Ser. No. 14/919,208 (the "'9208 application"), filed Oct. 21, 2015 by Michael K. Bugenhagen, entitled, "Access Constructs for Cloud Orchestration," which claims priority to U.S. Patent Application Ser. No. 62/109,718 (the "'718 application"), filed Jan. 30, 2015 by Michael K. Bugenhagen, entitled, "Access Constructs for Cloud Orchestration"; U.S. patent application Ser. No. 14/583,952 (the "'952 application"), filed Dec. 29, 2014 by Michael K. Bugenhagen, entitled, "Multi-line/Multi-state Virtualized OAM Transponder," which claims priority to U.S. Patent Application Ser. No. 62/038,201 (the "'201 application"), filed Aug. 15, 2014 by Michael K. Bugenhagen, entitled, "Multi-line/Multi-state Virtualized OAM Transponder"; U.S. patent application Ser. No. 14/460,085 (the "'085 application"), filed Aug. 14, 2014 by Michael K. Bugenhagen, entitled, "Ethernet Carrier Group Alarm (CGA)," which claims benefit of priority to provisional U.S. Patent Application Ser. No. 61/865,865 (the "'865 application"), filed Aug. 14, 2013 by Michael K. Bugenhagen, entitled, "Ethernet Carrier Group Alarm (CGA)"; and U.S. patent application Ser. No. 14/531,000 (the "'000 application"), filed Nov. 3, 2014 by Michael K. Bugenhagen, entitled, "Physical to Virtual Network Transport Function Abstraction," which claims benefit of priority to provisional U.S. Patent Application Ser. No. 61/907,330 (the "'330 application"), filed Nov. 21, 2013 by Michael K. Bugenhagen, entitled, "Physical to Virtual Network Transport Function Abstraction."

This application may also be related to U.S. patent application Ser. No. 14/730,695 (the "'695 application"), filed Jun. 4, 2015 by Charles I. Cook et al., entitled, "Remoting Application Servers," which claims benefit of priority to provisional U.S. Patent Application Ser. No. 62/037,096 (the "'096 application"), filed Aug. 13, 2014 by Charles I. Cook et al., entitled, "Remoting Application Servers." This application may also be related to U.S. patent application Ser. No. 12/433,181 (the "'181 application"), filed Apr. 30, 2009 by Michael K. Bugenhagen, entitled, "System and Method for a Small Form Pluggable Ethernet Demarcation Device."

This application may also be related to U.S. patent application Ser. No. 14/678,208 (the "'8208 Application"), filed on a date on Apr. 3, 2015 by Michael J. Fargano et al., entitled, "Network Functions Virtualization Interconnection Gateway," U.S. patent application Ser. No. 14/678,280 (the "'280 Application"), filed on a date on Apr. 3, 2015 herewith by Michael J. Fargano et al., entitled, "Network Functions Virtualization Interconnection Hub," and U.S. patent application Ser. No. 14/678,309 (the "'309 Application"), filed on a date on Apr. 3, 2015 by Michael J. Fargano et al., entitled, "Customer Environment Network Functions Virtualization (NFV)." Each of the '8208, '280, and '309 Applications claims priority to U.S. Patent Application Ser. No. 61/974,927 (the "'927 Application"), filed Apr. 3, 2014 by Michael J. Fargano, entitled, "Network Functions Virtualization Interconnection Gateway," U.S. Patent Application Ser. No. 61/974,930 (the "'930 Application"), filed Apr. 3, 2014 by Michael J. Fargano, entitled, "Network Functions Virtualization Interconnection Hub," U.S. Patent Application Ser. No. 61/976,896 (the "'896 Application"), filed Apr. 8, 2014 by Michael J. Fargano, entitled, "Customer Environment Network Functions Virtualization (NFV)," and to U.S. Patent Application Ser. No. 61/977,820 (the "'820 application"), filed Apr. 10, 2014 by Michael J. Fargano, entitled, "Customer Environment Network Functions Virtualization (NFV)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing communications between a host computing system and client devices coupled to one or more ports, and, in particular embodiments, to methods, systems, and computer software for implementing communications between two or more virtual machines ("VMs") and client devices coupled to one or more ports via a VM-to-Port peripheral device driver.

BACKGROUND

In typical dedicated computing systems that run on computing platforms, on which a single operating system ("OS") is running, the single OS communicates with one or more physical ports of the computing platform device. Communications between the OS and a client device that is communicatively coupled to one of the physical ports is accomplished on a one-to-one basis, and is relatively easy to configure and map (in some cases, using a conventional client device driver). In a virtualized environment or virtualized host computing system, however, there are typically two or more virtual machines ("VMs") running on the host computing system. Each VM has to share the resources of the host device with each of the other VMs running on the host computing system of the host device. In such a situation, conventional operating system client drivers would be insufficient to provide the proper mapping for effectuating the interconnection or interface between the VM and the physical resources of the host device, or the physical resources of any client devices that are communicatively coupled to ports of the host device. This is because neither any of the VMs nor the host virtualization computing system would know how to properly allocate resources of the host device to each VM, much less to properly allocate resources of any client devices that are communicatively coupled to the ports of the host device, even with the conventional client drivers installed.

Particularly in the context of pluggable devices—including, but not limited to, a small form factor pluggable ("SFP") device, an enhanced SFP ("SFP+") device, a compact SFP ("CSFP") device, a gigabit interface converter ("GBIC"), a universal serial bus ("USB") pluggable device, a device which is connected to a specific physical port on the host computing system, and/or the like, where at least one of the SFP device, the SFP+ device, or the CSFP device might include, but is not limited to, a SFP network interface device ("NID"), or the like—certain pluggable devices (e.g., SFP NIDs or the like) typically have one or more maintenance entities ("MEs") or one or more maintenance end points ("MEPs") thereon that perform Performance and/or Fault Isolation roles, or the like. The one or more MEs or one or more MEPs manage themselves and each has its own OS, and thus are generally not configured to work with a router or switch OS (i.e., OS of a network host device) as a peripheral device or client device, particularly where the network host device has a virtual host computing system on which two or more VMs are running.

Hence, there is a need for more robust and scalable solutions for implementing communications between a host computing system and client devices coupled to one or more ports, and, in particular embodiments, to methods, systems, and computer software for implementing communications between two or more virtual machines ("VMs") and client devices coupled to one or more ports via a VM-to-Port peripheral device driver.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
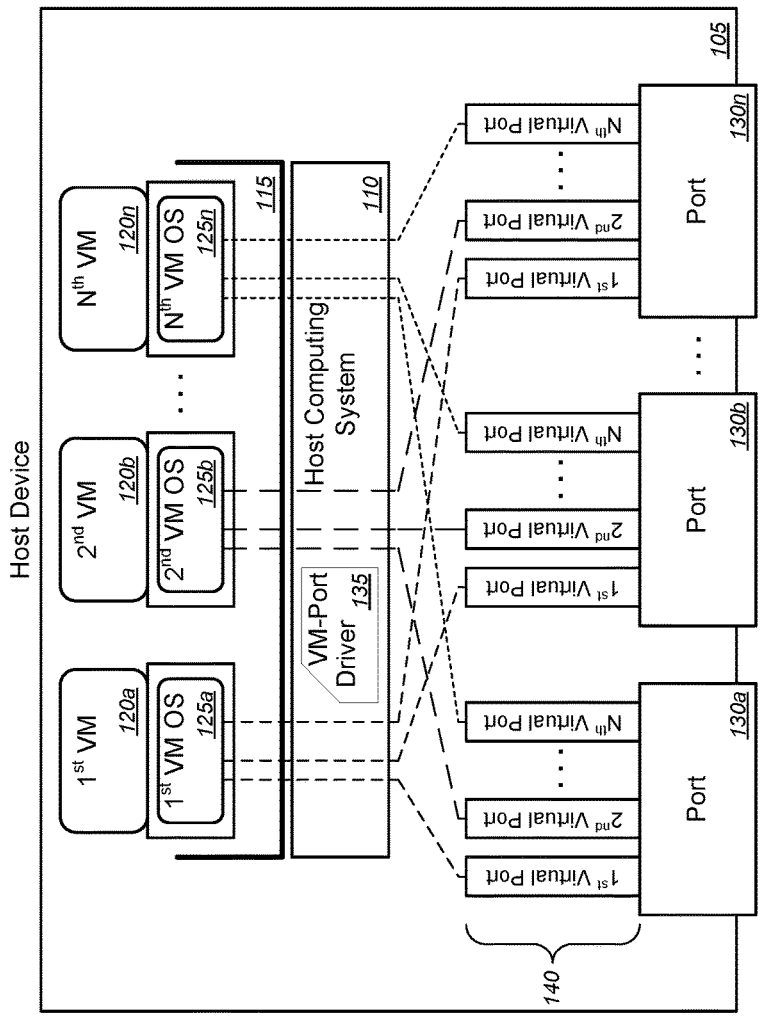
FIG. 1 is a schematic diagram illustrating a system for implementing communications between two or more virtual machines ("VMs") and one or more ports of a host device via a VM-to-Port peripheral device driver, in accordance with various embodiments.

Various embodiments provide tools and techniques for implementing communications between a host computing system and client devices coupled to one or more ports, and, in particular embodiments, to methods, systems, and computer software for implementing communications between two or more virtual machines ("VMs") and client devices coupled to one or more ports via a VM-to-Port peripheral device driver.

In various embodiments, an orchestration agent running on a host computing system of a host device might configure, using a virtual-machine ("VM")-to-port peripheral device driver (also referred to "VM-to-port driver," "VM-to-client driver," "VM-port driver," or "VM-client driver"), a physical port of the host device to establish two or more virtual ports that are associated with the physical port. The orchestration agent might subsequently map, using the VM-to-port peripheral device driver, each of two or more VMs running on the host computing system with corresponding each of the two or more virtual ports associated with the physical port.

In some instances, when a client device is communicatively coupled to the physical port (or is determined to be communicatively coupled to the physical port), the orchestration agent might map, using the VM-to-port peripheral device driver, each of the two or more VMs with one or more functions of the client device via corresponding each of the two or more virtual ports associated with the physical port to which the client device is communicatively coupled. In some cases, the one or more functions might include, without limitation, at least one of an activation function, an operation function, a deletion function, a specialized function, or an operations, administration, and management ("OAM") function, and/or the like. The one or more functions, according to some embodiments, might be any "dedicated" function that is not conducted within the VM, but is associated directly with the VM, such "dedicated" functions including, but not limited to, printer functions, universal serial bus ("USB") functions, OAM functions, and/or the like, of a peripheral client device that is desired to be associated directly with one and only one VM on the host computing system, and that requires a driver (such as the VM-to-port peripheral device driver, or the like) to be assignable in that fashion.

The orchestration agent, in some embodiments, might allocate, using the VM-to-port peripheral device driver, resource usage times for the client device that is communicatively coupled to the physical port, to each of the two or more VMs. In some instances, this might include, but is not limited to, the orchestration agent scheduling, using the VM-to-port peripheral device driver, time slices to each of the two or more VMs during which each VM can use resources associated with the client device that is communicatively coupled to the physical port.

Merely by way of example, the client device might be one of a small form factor pluggable ("SFP") device, an enhanced SFP ("SFP+") device, a compact SFP ("CSFP") device, a gigabit interface converter ("GBIC"), and a universal serial bus ("USB") pluggable device, and/or the like. For the purposes of this disclosure, "client device" might refer to a "client peripheral device" or "client VM peripheral device," and these terms are used interchangeably herein. The client device, according to some embodiments, can be any physical device that can be plugged into a specific port, including, without limitation, a probe, a transponder, and/or the like. In some instances, at least one of the SFP device, the SFP+ device, or the CSFP device might be a SFP network interface device ("NID"), a router, a modem, a wireless access point, and/or any device that is providing a "host" virtualized layer as described by Network Functions Virtualization ("NFV"), or the like. In some cases, the USB pluggable device might be one of a printer, a scanner, a combination printer/scanner device, an external hard drive, a camera, a keyboard, a mouse, a drawing interface device, or a mobile device, and/or the like. The host device, according to some embodiments, might be one of a router, a switch, a network element, a demarcation device, a WiFi device, a kernel-based virtual machine ("KVM")-based host machine, an ESX-based host machine, and an ESXi-based host machine, and/or the like. The VM-to-port peripheral device driver might be one of software application, a program, or a virtual network function ("VNF"), or the like. VNFs in general are described in more detail with respect to the '9208, '952, '695, '8208, '280, and '309 applications, which have already been incorporated herein by reference in their entirety. In the context of remotely sending VNFs (e.g., where the VM-to-port peripheral device driver is sent as a VNF over one or more networks to the host computing system or host device), such functionality is described in detail with respect to the '695, '8208, '280, and '309 applications.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, VM-port interface or communications technology, VM-client interface or communications technology, network virtualization technology, network configuration technology, and/or the like. In other aspects, certain embodiments, can improve the functioning of a computer or network system itself (e.g., computing devices or systems that form parts of the network, computing devices or systems, network elements or the like for performing the functionalities described below, etc.), for example, by enabling communications between two or more virtual machines ("VMs") and client devices coupled to one or more ports (i.e., via a VM-to-Port peripheral device driver), thereby improving network and/or computing system functionalities, and/or the like. In particular, to the extent any abstract concepts are present in the various embodiments, those concepts can be implemented as described herein by devices, software, systems, and methods that involve specific novel functionality (e.g., steps or operations), such as enabling communications between two or more VMs and client devices coupled to one or more ports and/or the like, to name a few examples, that extend beyond mere conventional computer processing operations. These functionalities can produce tangible results outside of the implementing computer system, including, merely by way of example, ability to enable communications between two or more VMs and client devices coupled to one or more ports where such is conventionally impossible (without use of a VM-to-Port peripheral device driver or the like), and/or the like, which may be observed or measured by customers and/or service providers.

In an aspect, a method might comprise configuring, with an orchestration agent running on a host computing system of a host device and using a virtual-machine ("VM")-to-port peripheral device driver, a physical port of the host device to establish two or more virtual ports that are associated with the physical port. The method might further comprise mapping, with the orchestration agent and using the VM-to-port peripheral device driver, each of two or more VMs running on the host computing system with corresponding each of the two or more virtual ports associated with the physical port.

In some embodiments, when a client device is communicatively coupled to the physical port, mapping each of the two or more VMs with corresponding each of the two or more virtual ports associated with the physical port might comprise mapping, with the orchestration agent and using the VM-to-port peripheral device driver, each of the two or more VMs with one or more functions of the client device via corresponding each of the two or more virtual ports associated with the physical port to which the client device is communicatively coupled. In some instances, the one or more functions of the client device might comprise at least one of an activation function, an operation function, a deletion function, a specialized function, or an operations, administration, and management ("OAM") function, and/or the like. According to some embodiments, the orchestration agent might be an orchestrator in a host layer of the host computing system that controls the host computing system and enables peripheral device configuration for enabling the one or more functions of the client device to be mapped to each of the two or more VMs. In some embodiments, the "Host OS" and any "orchestrators" controlling the host configurations might provide the users with information on "inventory," "state," and mapping of peripheral clients as part of the host and orchestration system mapping, performance monitoring, usage, and other typical host and Orchestrator Operational, Administration, and Accounting functions, logs, portals, and other system and OS mechanisms.

According to some embodiments, the method might further comprise allocating, with the orchestration agent, using the VM-to-port peripheral device driver, and to each of the two or more VMs, resource usage times for the client device that is communicatively coupled to the physical port. In some cases, allocating to each of the two or more VMs resource usage times for the client device might comprise scheduling, with the orchestration agent and using the VM-to-port peripheral device driver, time slices to each of the two or more VMs during which each VM can use resources associated with the client device that is communicatively coupled to the physical port.

Merely by way of example, in some instances, the client device might be a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, or the like. In some embodiments, at least one of the SFP device, the SFP+ device, or the CSFP device might comprise a SFP network interface device ("NID"), a SFP router, a SFP modem, or a SFP wireless access point, and/or the like. In some cases, the USB pluggable device might comprise one of a printer, a scanner, a combination printer/scanner device, an external hard drive, a camera, a keyboard, a mouse, a drawing interface device, or a mobile device, and/or the like.

According to some embodiments, the host device might be a device selected from a group consisting of a router, a switch, a network element, a demarcation device, a WiFi device, a kernel-based virtual machine ("KVM")-based host machine, an ESX-based host machine, and an ESXi-based host machine, or the like. In some embodiments, the VM-to-port peripheral device driver might be a virtual network function ("VNF").

In another aspect, a host device might comprise one or more physical ports and a host computing system. The host computing system might comprise at least one processor and at least one non-transitory computer readable medium communicatively coupled to the at least one processor. The at least one non-transitory computer readable medium might have stored thereon computer software comprising a set of instructions that, when executed by the at least one processor, causes the host computing system to configure, using a virtual-machine ("VM")-to-port peripheral device driver, at least one physical port of the one or more physical ports to establish two or more virtual ports that are associated with the at least one physical port, and to map, using the VM-to-port peripheral device driver, each of two or more VMs running on the host computing system with corresponding each of the two or more virtual ports associated with the at least one physical port.

In some embodiments, when a client device is communicatively coupled to a particular physical port of the at least one physical port, mapping each of the two or more VMs with corresponding each of the two or more virtual ports associated with the at least one physical port might comprise mapping, using the VM-to-port peripheral device driver, each of the two or more VMs with one or more functions of the client device via corresponding each of the two or more virtual ports associated with the particular physical port to which the client device is communicatively coupled. In some instances, the one or more functions of the client device might comprise at least one of an activation function, an operation function, a deletion function, a specialized function, or an operations, administration, and management ("OAM") function, and/or the like. In some embodiments, the host computing system might comprise an orchestrator in a host layer of the host computing system, and the orchestrator might control the host computing system and might enable peripheral device configuration for enabling the one or more functions of the client device to be mapped to each of the two or more VMs.

According to some embodiments, the set of instructions, when executed by the at least one processor, further causes the host computing system to allocate, using the VM-to-port peripheral device driver and to each of the two or more VMs, resource usage times for the client device that is communicatively coupled to the particular physical port. In some cases, allocating to each of the two or more VMs resource usage times for the client device might comprise scheduling, using the VM-to-port peripheral device driver, time slices to each of the two or more VMs during which each VM can use resources associated with the client device that is communicatively coupled to the particular physical port.

Merely by way of example, in some instances, the client device might be a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device, or the like. In some embodiments, at least one of the SFP device, the SFP+ device, or the CSFP device might comprise a SFP network interface device ("NID"), a SFP router, a SFP modem, or a SFP wireless access point, and/or the like. In some cases, the USB pluggable device might comprise one of a printer, a scanner, a combination printer/scanner device, an external hard drive, a camera, a keyboard, a mouse, a drawing interface device, or a mobile device, and/or the like.

According to some embodiments, the host device might be a device selected from a group consisting of a router, a switch, a network element, a demarcation device, a WiFi device, a kernel-based virtual machine ("KVM")-based host machine, an ESX-based host machine, and an ESXi-based host machine, or the like. In some embodiments, the VM-to-port peripheral device driver might be a virtual network function ("VNF").

Various modifications and additions can be made to the embodiments discussed without departing from the scope of the invention. For example, while the embodiments described above refer to particular features, the scope of this invention also includes embodiments having different combination of features and embodiments that do not include all of the above described features.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

An "application programming interface" ("API") might refer to a protocol intended to be used as an interface by software components to communicate with each other.

"Virtualization" might refer to a process of mapping hardware resources to create "virtual machine resource" within the framework of the VMs so that the VM environment may utilize the hardware resources.

Specific Exemplary Embodiments

We now turn to the embodiments as illustrated by the drawings. FIGS. 1-7 illustrate some of the features of the method, system, and apparatus for implementing communications between a host computing system and client devices coupled to one or more ports, and, in particular embodiments, to methods, systems, and computer software for implementing communications between two or more virtual machines ("VMs") and client devices coupled to one or more ports via a VM-to-Port peripheral device driver, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

FIG. 1 is a schematic diagram illustrating a system 100 for implementing communications between two or more virtual machines ("VMs") and one or more ports of a host device via a VM-to-Port peripheral device driver, in accordance with various embodiments.

In FIG. 1, system 100 comprises a host device 105, which might include, without limitation, at least one of a router, a switch, a network element, a demarcation device (e.g., a customer premises network interface device ("NID"), an optical network terminal ("ONT"), and/or the like), a WiFi device, a kernel-based virtual machine ("KVM")-based host machine, an ESX-based host machine, an ESXi-based host machine, and/or the like. In some embodiments, the host device 105 might comprise a host computing system 110, which might comprise a virtual environment 115, in which one or more VMs 120 (in some cases, two or more VMs 120) are running. The one or more VMs 120 might include, but are not limited to, a first VM 120a, a second VM 120b, through an $N^{th}$ VM 120n (collectively, "VMs 120"), each of which has a corresponding operating system ("OS") or an instance of the host OS, namely, a first VM OS 125a, a second VM OS 125b, through an $N^{th}$ VM OS 125n (collectively, "VM OSs 125"). The host device 105 might further comprise one or more physical ports 130, including, without limitation, a first physical port 130a, a second physical port 130b, through an $N^{th}$ physical port 130n (collectively, "physical ports 130" or "ports 130").

Figure 4A:
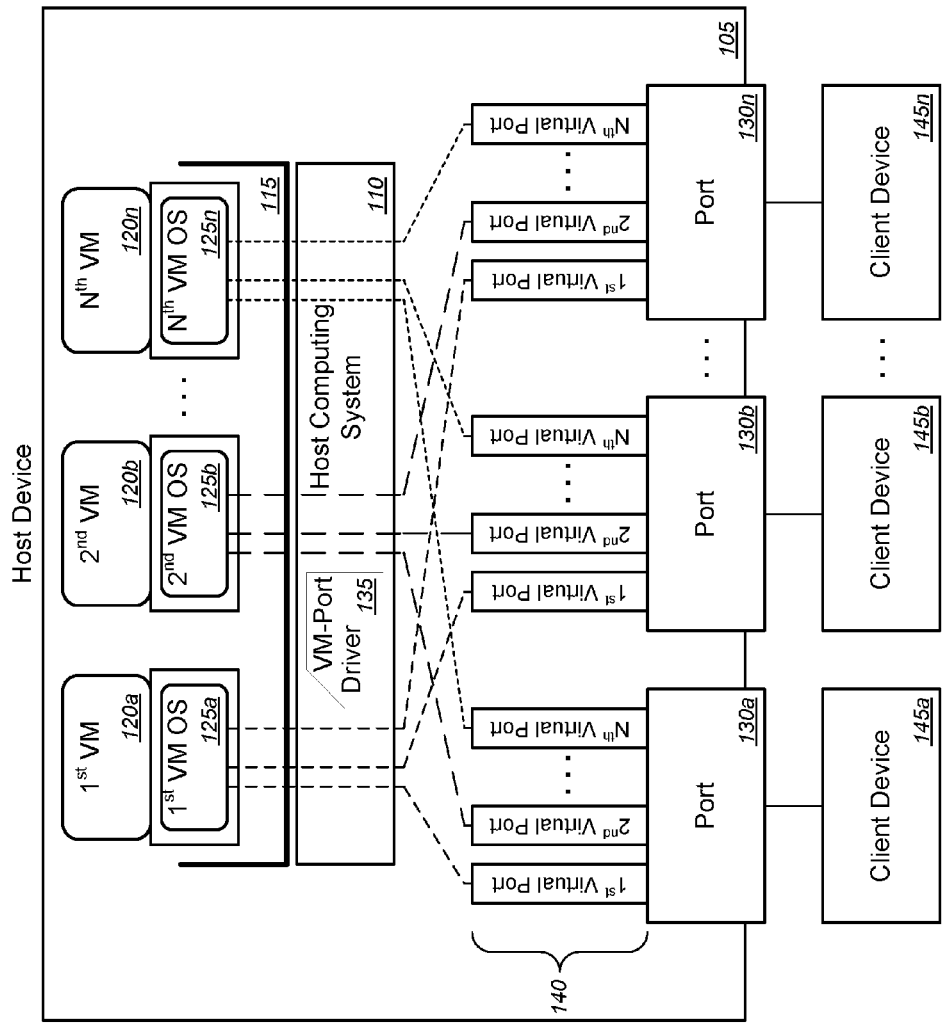
FIGS. 4A and 4B are schematic diagrams illustrating a system for implementing communications between two or more VMs and one or more client devices coupled to corresponding one or more ports via a VM-to-Port peripheral device driver, in accordance with various embodiments.
Figure 4B:
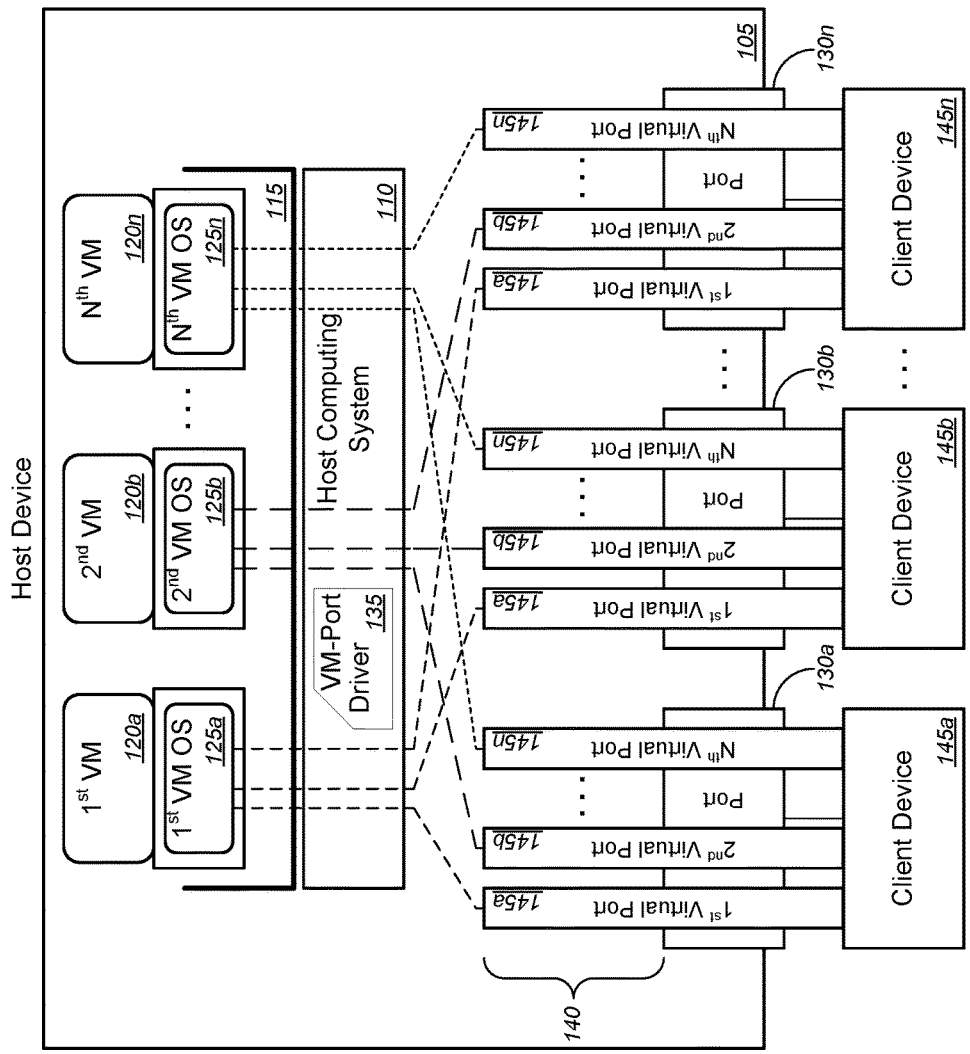

In accordance with various embodiments, a VM-to-Port peripheral device driver 135 might be installed on the host computing system 110 of the host device 105. The VM-to-Port peripheral device driver 135—in some cases, via an orchestration agent running on the host computing system 110 (e.g., orchestration agent 235 of FIG. 2B or the like)—might configure at least one physical port 130 of the one or more physical ports 130a-130n to establish two or more virtual ports 140 that are associated with the at least one physical port 130. The two or more virtual ports might include, but are not limited to, a first virtual port 140a, a second virtual port 140b, through an $N^{th}$ virtual port 140n (collectively, "virtual ports 140"), each corresponding to the first VM 120a, the second VM 120b, through the $N^{th}$ VM 120n, respectively. The VM-to-Port peripheral device driver 135—in some cases, via the orchestration agent—might map each of two or more VMs 120 running on the host computing system 110 with corresponding each of the two or more virtual ports 140 associated with the at least one physical port 130 (e.g., as depicted in FIGS. 1, 4A, and 4B by the dashed lines connecting the first VM OS 125a to each first virtual port 140a, the long dashed lines connecting the second VM OS 125b to each second virtual port 140b, and the short dashed lines connecting the $N^{th}$ VM OS 125n to each $N^{th}$ virtual port 140n).

The VM-to-Port peripheral device driver 135—which might be a software application, a program, or a virtual network function ("VNF"), or the like—, when installed on the host computing system 110, allows, via the configuration of the physical ports 130 and the mapping of virtual ports to the physical ports, proper communication between each VM of the two or more VMs 120 running on the host computing system 110 and each physical port 130. VNFs are described in more detail with respect to the '9208, '952, '695, '8208, '280, and '309 applications, which have already been incorporated herein by reference in their entirety. In some embodiments, the VM-to-port peripheral device driver 135 may be sent as a VNF over one or more networks to the host computing system or host device, and such functionality is described in detail with respect to the '695, '8208, '280, and '309 applications.

More importantly, the VM-to-Port peripheral device driver 135, when installed on the host computing system 110, allows, via the configuration of the physical ports 130 and the mapping of virtual ports to the physical ports, proper allocation of resources of the host device 105 to each VM of the two or more VMs 120 running on the host computing system 110 of the host device 105. And, as described below with reference to FIGS. 4A and 4B, the VM-to-Port peripheral device driver 135, when installed on the host computing system 110, allows, via the configuration of the physical ports 130 and the mapping of virtual ports to the physical ports, proper allocation of resources of client devices that are communicatively coupled to physical ports of the host device 105 to each VM of the two or more VMs 120 running on the host computing system 110 of the host device 105.

In some embodiments, even if a particular VM dies, crashes, or has otherwise been rendered inoperable, the host computing system 110 (or the orchestration agent or the like) might provide—via the configuration of the physical ports 130 and the mapping of virtual ports to the physical ports (when the VM-to-Port peripheral device driver 135 is installed on the host computing system 110)—at least one signal to the affected physical port(s) and/or to the affected client device(s) that is(are) communicatively coupled to the affected physical port(s) indicating that the communication path between the host computing system 110 and the affected physical port(s) is still up, operation, or otherwise good (despite the particular VM having died, crashed, or otherwise been rendered inoperable).

Figure 2A:
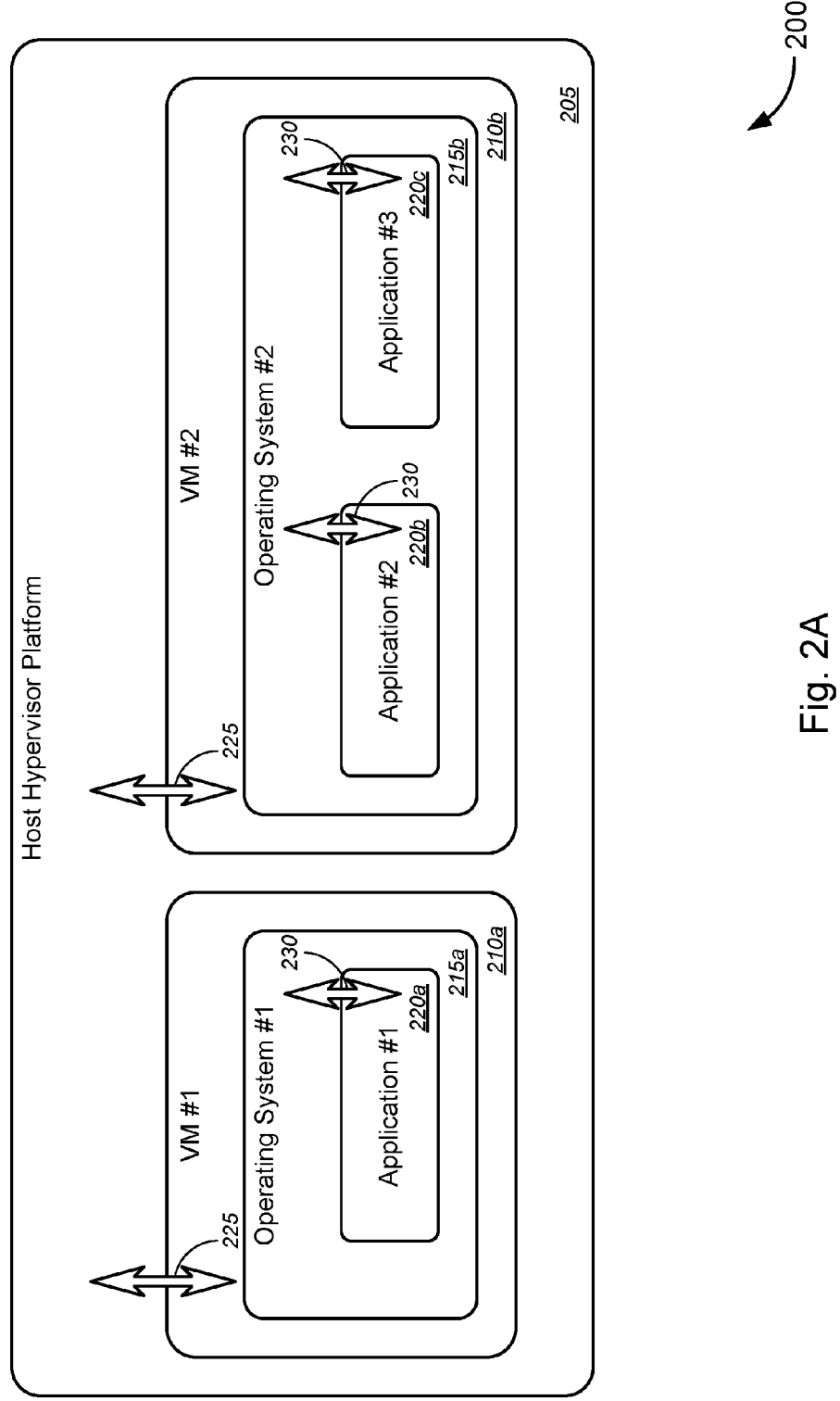
FIG. 2A is a general schematic diagram illustrating a system for implementing physical to virtual (network) transport function abstraction, in accordance with various embodiments.
Figure 2B:
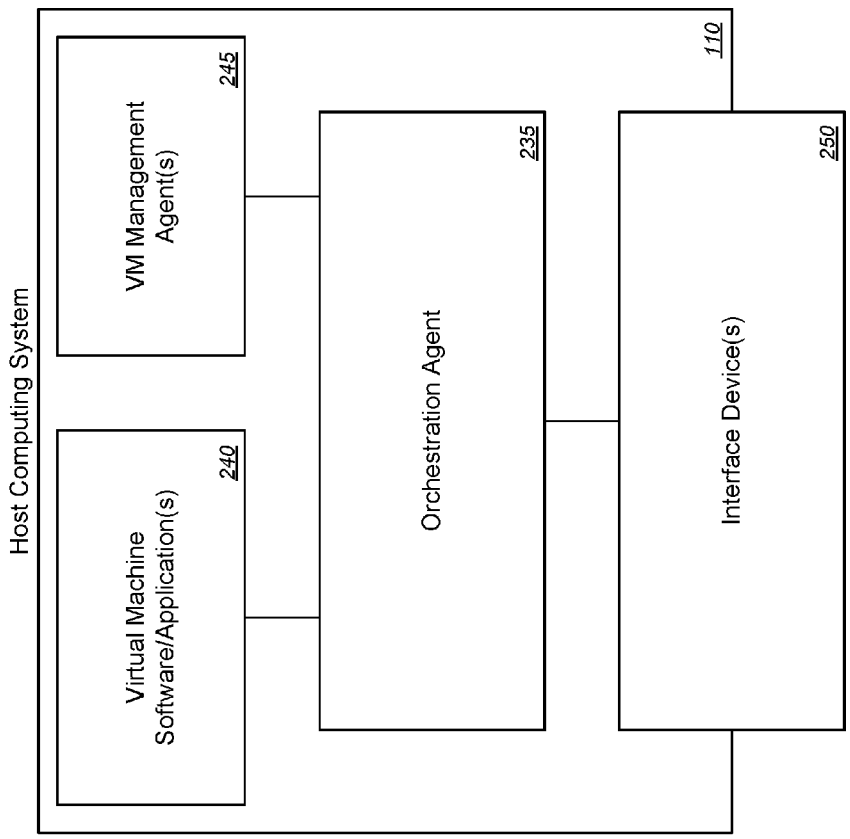
FIG. 2B is a block diagram illustrating a system for implementing applications management, in some cases, based at least in part on operations, administration, and management ("OAM") information monitored by dedicated OAM management agents, in accordance with various embodiments.

FIGS. 2A and 2B (collectively, "FIG. 2") depict various embodiments of systems that implement physical to virtual transport function abstraction and/or that implement applications management in a host computing system that utilizes VM software and/or applications. In particular, FIG. 2A is a general schematic diagram illustrating a system 200 for implementing physical to virtual (network) transport function abstraction, in accordance with various embodiments. FIG. 2B is a block diagram illustrating a system 200' for implementing applications management, in some cases, based at least in part on operations, administration, and management ("OAM") information monitored by dedicated OAM management agents, in accordance with various embodiments.

Figure 5A:
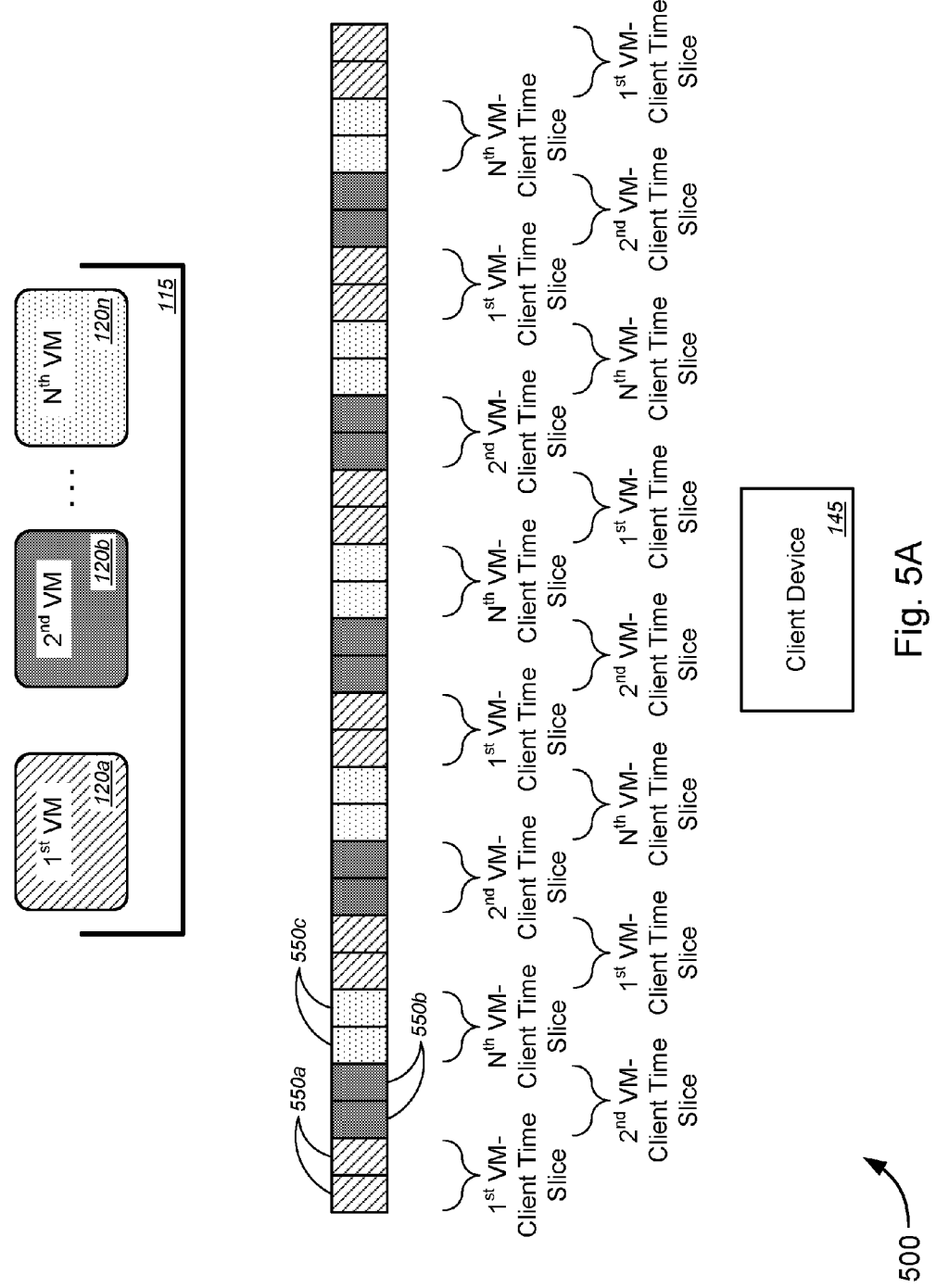
FIGS. 5A and 5B are schematic diagrams illustrating various methods for scheduling or allocating resource time slices for a client device amongst two or more different VMs, in accordance with various embodiments.
Figure 5B:
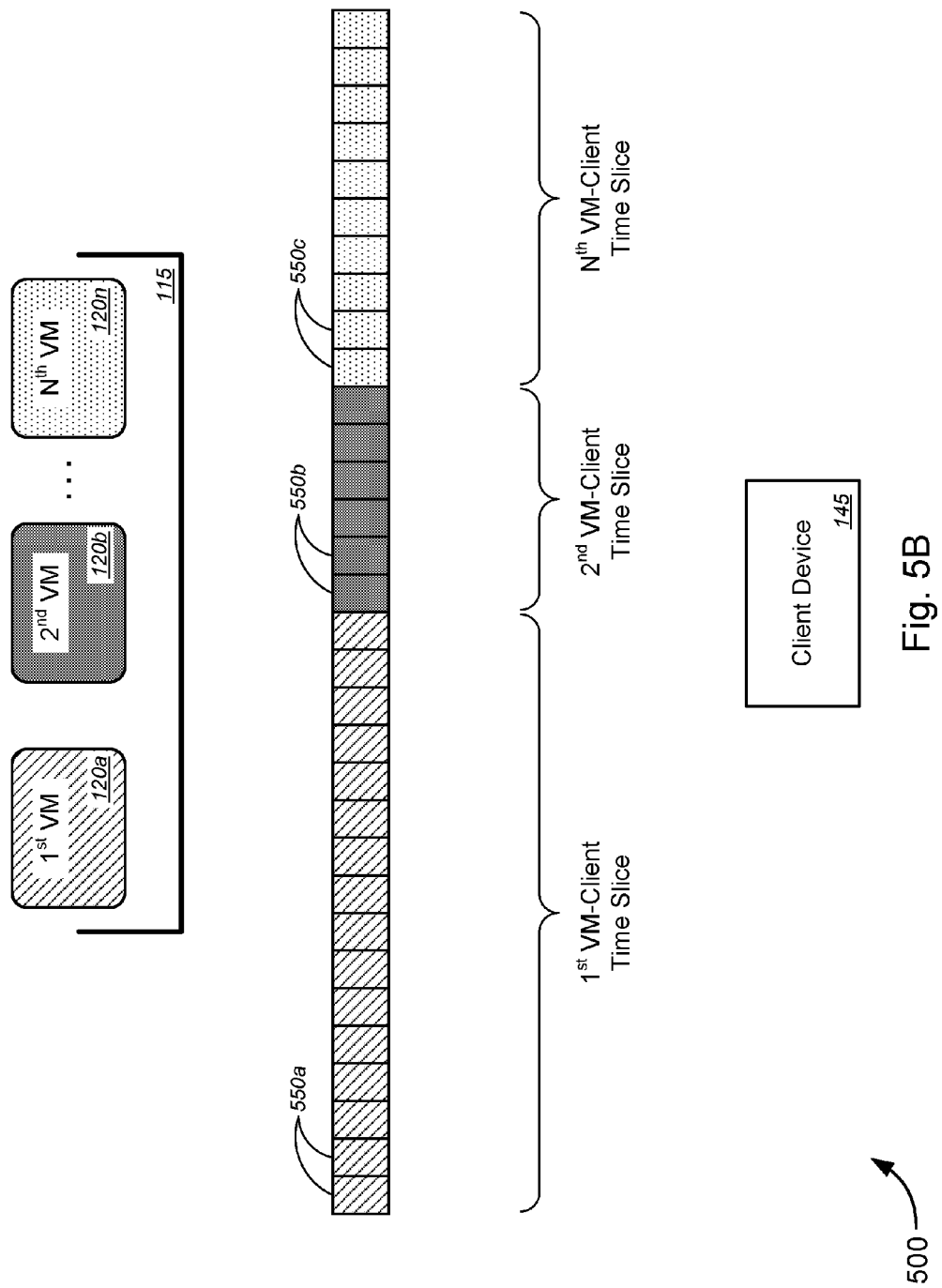
Figure 6:
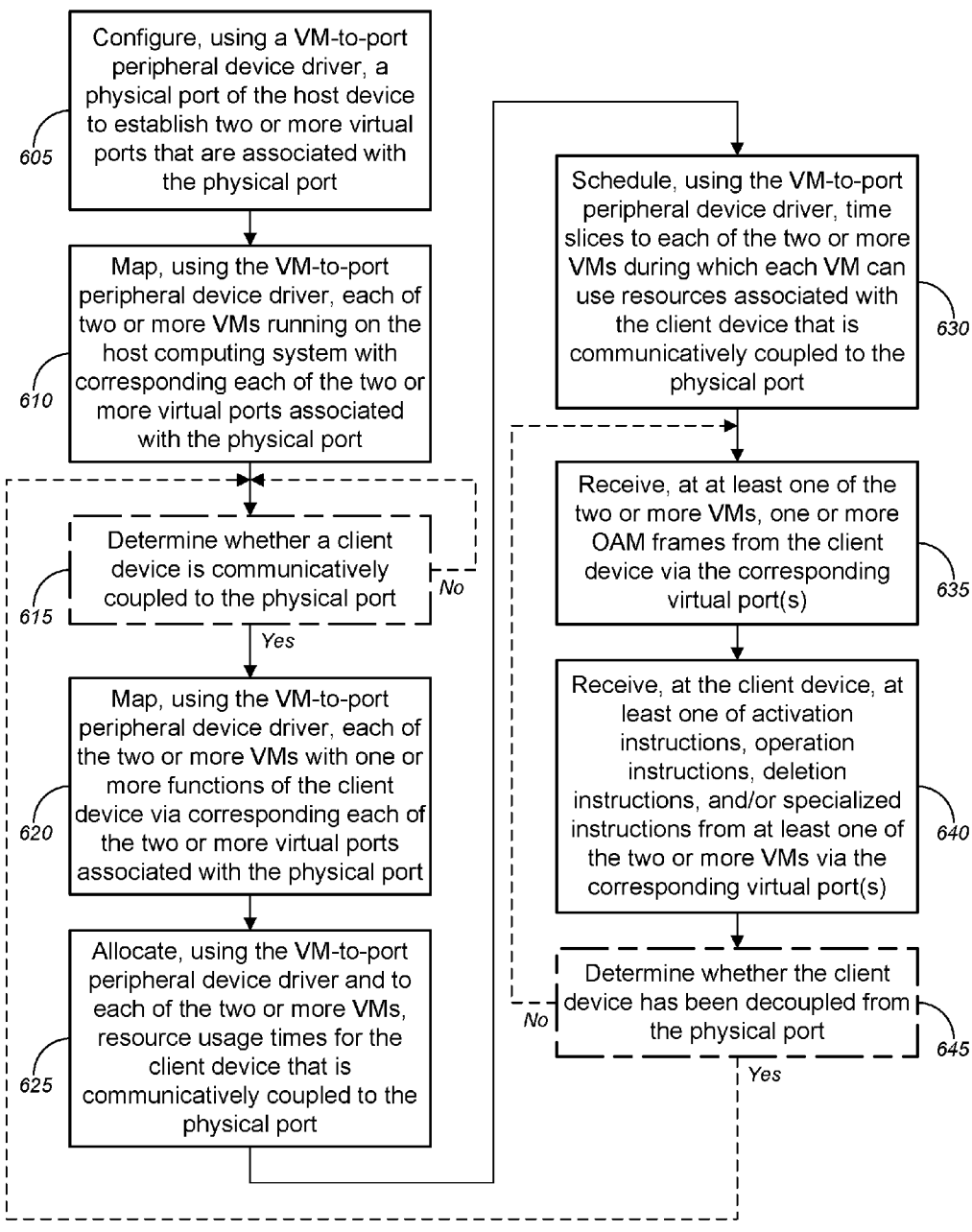
FIG. 6 is a flow diagram illustrating a method for communications between two or more VMs and one or more client devices coupled to corresponding one or more ports via a VM-to-Port peripheral device driver, in accordance with various embodiments.

FIG. 2A herein and FIGS. 4-6 (and in some embodiments, FIGS. 1 and 2) of the '000 application (which has already been incorporated herein by reference in its entirety) illustrate systems in which physical to virtual (network) transport function abstraction may be implemented to provide the software applications running in the VM with state information (or similar information) necessary for the software applications to continue running, without the physical ports that would provide such information in a physical system.

In FIG. 2A, a general schematic diagram is shown illustrating a system 200 for implementing physical to virtual transport function abstraction (in some cases, network transport function abstraction), in accordance with various embodiments. System 200 might comprise a host hypervisor platform 205 on which one or more virtual machine ("VM") environments 210 might operate. VM 210 might comprise a first VM 210a and a second VM 210b, or the like. Running on each VM 210 might be one or more operating systems 215. For example, a first operating system 215a might run on the first VM 210a, while a second operating system 215b might run on the second VM 210b. Each of the operating systems 215 might have running thereon one or more software applications 220.

In the non-limiting example of FIG. 2A, a first application 220a might run on the first operating system 215a, while a second application 220b and a third application 220c might each be running on the second operating system 215b. The hypervisor 205 might modify allocation of the application resources (including, but not limited to, memory and/or processor resources, etc.) between the hypervisor 205 and each VM 210, as shown by arrow(s) 225. Alternatively, or in addition, the hypervisor 205 might modify allocation of the application resources (including, but not limited to, memory and/or processor resources, etc.) between each operating system 215 and each software application 220, as shown by arrow(s) 230.

In some cases, the host hypervisor platform 205 or an operating system 215 running within one of the VMs 210 might monitor application resource utilization of the host computer system (e.g., host computing system 110 of FIG. 1, or the like), and the hypervisor 205 might modify allocation of application resources (e.g., as shown by one or both of arrows 225 and 230), based on a determination that application resource utilization has changed. According to some embodiments, the hypervisor 205 might modify allocation of application resources by increasing allocation of application resources to a first set of the one or more software applications, by decreasing allocation of application resources to a second set of the one or more software applications, or both. Such allocation of resources might, in some instances, be based on a determination that application resource utilization is approaching maximum resource use.

According to some embodiments, the hypervisor might provide information to the software applications 220. The information, in some cases, might include state information, including, without limitation, any, some, or all of the state information provided by any, some, or all of the information provided by physical ports (e.g., physical ports 130a-130n, as described above with respect to FIG. 1, or the like). In some cases, state information might include connection state information.

In the embodiment of FIG. 2B, system 200' might comprise a host computing system 110, an orchestration agent 235, one or more VM software applications 240, one or more VM management agents 245, and one or more interface devices 250. Each of the orchestration agent 235, the one or more VM software applications 240, and the one or more VM management agents 245 might be running on the host computing system 110. In some cases, the orchestration agent 235 might be communicatively coupled to each of the one or more VM software applications 240, each of the one or more VM management agents 245, and each of the one or more interface devices 250. In some embodiments, the one or more VM management agents 245 might correspond to the virtual network function components/container ("VNFC") Host agent 520a as shown and described with respect to FIG. 5 of the '952 application (which has already been incorporated herein by reference in its entirety).

According to various embodiments, each of the one or more VM management agents is a dedicated OAM management agent—that is, each of the one or more VM management agents is configured to only handle (i.e., receive, generate, send, and/or perform functions based on) OAM frames sent or received via the orchestration agent 235. This differs from typical VM systems in which the VM software applications might receive, send, and/or perform functions based on OAM frames, in addition to receiving, sending, and/or performing functions based on application frames. A problem with routing OAM frames through the VM software application is that when the VM software application is suspended (for any number of reasons), the OAM frames received by or not yet sent by the VM software application expires, dies, or is otherwise lost. Here, only the VM management agents 245 receive send, and/or perform functions based on the OAM frames (and in some cases, generate OAM frames). By using a dedicated OAM management agent, such as shown in the embodiment of FIG. 2B, even if the VM software application is suspended (for whatever reason), the OAM frames remain unaffected.

In some embodiments, the one or more VM software applications 240 might include, without limitation, one or more VM software, one or more VM applications, and/or a combination of these. In some instances, the orchestration agent 235 might include, but is not limited to, an orchestrator (e.g., orchestrator 265 in FIG. 2 of the '952 application, or the like), a hypervisor (e.g., hypervisor 235 in FIG. 2 of the '952 application, or the like), an operating system ("OS") of the host computing system (also referred to as "host OS"), a container (e.g., container 535 in FIG. 5 of the '952 application, or the like), an input/output ("I/O") scheduler function, a virtual Ethernet function, a host scheduler, a shim function, and/or the like.

According to some embodiments, the one or more interface devices 250 might include, without limitation, one or more physical Ethernet ports, one or more port acceleration hardware, and/or the like, and all of the one or more interface devices 250 might be components of the host computing system 110 or might be devices separate from yet communicatively coupled to the host computing system 110. In some cases, some of the one or more interface devices 250 might be components of the host computing system 110, while others of the one or more interface devices 250 might be devices separate from yet communicatively coupled to the host computing system 110. The one or more interface devices 250 might communicatively couple the orchestration agent 235 with one or more hardware components (not shown in FIG. 2B). In some instances, the one or more hardware components might include, without limitation, one or more storage devices, one or more networks, one or more network components/devices, one or more special function devices, and/or the like. In some cases, the one or more storage devices might include, but are not limited to, one or more storage drives, one or more Universal Serial Bus ("USB") drives, one or more storage network or storage network connections, and/or the like. The one or more storage network or storage network connections might include, without limitation, one or more storage area networks ("SANs"), one or more local area networks ("LANs"), one or more fiber channels ("FC") or FC over Ethernet ("FCoE"), and/or the like. In some instances, the one or more network components/devices might include, without limitation, one or more gateway devices, one or more virtual networks, one or more external interfaces, and/or the like. In some cases, the one or more special function devices might include, but are not limited to, one or more special function cards, one or more bearer oriented special function cards, and/or the like.

In one set of embodiments, as shown in the embodiment of FIG. 8A of the '952 application, normal application frame flow might be sent and received along one channel(s) (i.e., channel(s) 830 of FIG. 8A of the '952 application), while the OAM frame flow might be sent and received along another channel(s) (i.e., separate channel(s) 835 of FIG. 8A of the '952 application) that is separate from the one channel(s). In other words, the one channel(s) (i.e., channel(s) 830 of FIG. 8A of the '952 application) might allow (only) normal application frame flow to be sent and received between each of the one or more VM software applications 240 and the one or more hardware components, via the orchestration agent 235 and the one or more interface devices 250. The other channel(s) (i.e., channel(s) 835 of FIG. 8A of the '952 application) might allow (only) OAM frame flow to be sent and received between each of the one or more VM management agents 245 and the one or more hardware components, via the orchestration agent 235 and the one or more interface devices 250.

In an alternative set of embodiments, as shown in the embodiment of FIG. 8B of the '952 application, both the normal application frame flow and the OAM frame flow might be sent from and received by the orchestration agent 235, to and from the one or more interface devices 250 (including, but not limited to, physical Ethernet port and port acceleration hardware, and/or the like), and to and from the one or more hardware components, along one same channel(s) (i.e., channel(s) 840 of FIG. 8B of the '952 application). Each channel (i.e., each of channel(s) 840 of FIG. 8B of the '952 application) might be forked at the orchestration agent 235, such that the normal application frame flow may be sent from and received by the orchestration agent 235, to and from each of the one or more VM software applications 240, along one channel(s) (i.e., channel(s) 830 of FIG. 8B of the '952 application), while the OAM frame flow may be sent from and received by the orchestration agent 235, to and from each of the one or more VM management agents 245, along another channel(s) (i.e., separate channel(s) 835 of FIG. 8B of the '952 application). In other words, each of the one channel(s) (i.e., channel(s) 840 of FIG. 8B of the '952 application) might allow both the normal application frame flow and the OAM frame flow to be sent and received between the orchestration agent 235 and the one or more hardware components, via the one or more interface devices 250. At the orchestration agent 235 (or orchestration agent 810 of FIG. 8B of the '952 application), each of the channel(s) 840 is forked into the channel(s) 830 and the channel(s) 835, as shown in FIG. 8B of the '952 application. The channel(s) 830 might allow (only) normal application frame flow to be sent and received between each of the one or more VM software applications 240 and the orchestration agent 235 (i.e., VM software applications 815 and the orchestration agent 810 of FIG. 8B of the '952 application), while the channel(s) 835 might allow (only) OAM frame flow to be sent and received between each of the one or more VM management agents 245 and the orchestration agent 235 (i.e., VM management agents 820 and the orchestration agent 810 of FIG. 8B of the '952 application).

In some embodiments, the one or more VM management agents 245 might each include a multi-layer personality OAM server function. Here, as described with respect to FIG. 1 of the '952 application, "personality" in "multi-layer personality OAM server function" might refer to the OAM server function that monitors address, or monitors frames, and/or the like. In a similar manner as above, "multi-personality" might refer to simultaneous monitoring of address and frames, and/or other characteristics or types of information. "Multi-layer" or "multi-layer OAM monitoring function" (as in FIG. 1 of the '952 application) might refer to simultaneous monitoring of multiple layers (e.g., simultaneous monitoring of layer 2 and layer 3, and/or the like) and/or simultaneous monitoring of any combination of Ethernet OAM information, IP OAM information, Internet protocol/multiprotocol label switching ("IP/MPLS") OAM information, MPLS OAM information, two-way active measurement protocol ("TWAMP") OAM information, IPsec information, virtual private network information, application layer information, and/or the like. Because multiple types of OAM and other information may be monitored (in some cases simultaneously), the OAM servers and/or the VM management agents 245 might be referred to as being "multi-lingual." In some cases, each of the one or more VM management agents 245 might comprise an OAM server.

In some aspects, the one or more VM management agents 245 (as multi-layer personality OAM servers or having multi-layer personality OAM server function) might include new virtual states for CMs, an OAM frame generator, hot upgradeable OAM settings, and/or the like, as described in detail with respect to FIGS. 9-11 of the '952 application.

In the context of the various embodiments described herein, the orchestration agent 235, the VM software application(s) 240, (optionally) the VM management agent(s) 245, and the interface device(s) 250 are shown and described in FIG. 2B to provide context for the relationship between each of these components and the host computing system 110, as some of these components may be utilized to implement communications between a host computing system and client devices coupled to one or more ports, and, in particular embodiments, to methods, systems, and computer software for implementing communications between two or more virtual machines ("VMs") and client devices coupled to one or more ports via a VM-to-Port peripheral device driver, as described herein with reference to FIGS. 1 and 4-6.

Figure 3:
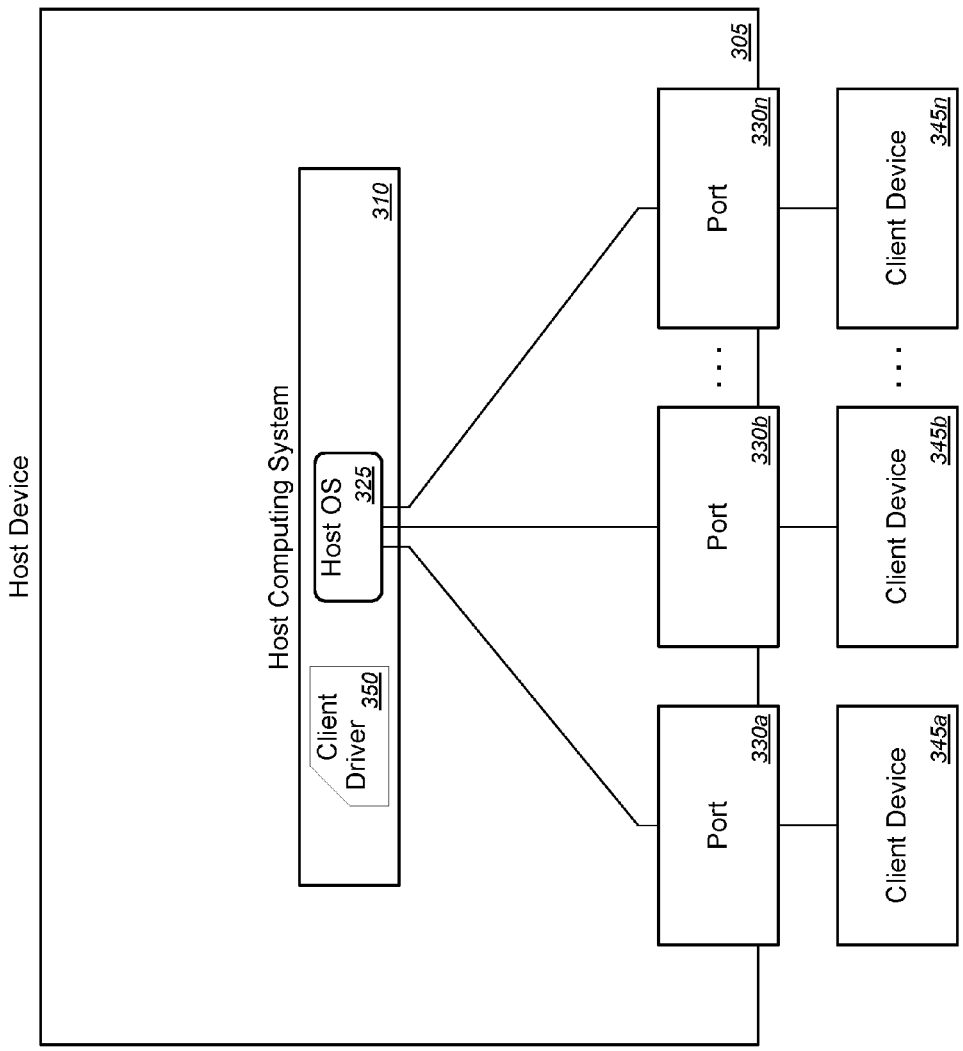
FIG. 3 is a block diagram illustrating a system for implementing communications between a single (non-virtual) host computing system operating system and one or more client devices coupled to corresponding one or more ports via a conventional client device driver.

We now turn to FIG. 3, which is a block diagram illustrating a system 300 for implementing communications between a single (non-virtual) host computing system operating system and one or more client devices coupled to corresponding one or more ports via a conventional client device driver.

In FIG. 3, a host device 305 might comprise a host computing system 310 on which a single host operating system ("OS") 325 is running. The single host OS 325 communicates with one or more physical ports 330 of the host device 305, in some cases via one or more interface devices (not shown, but not unlike interface devices 250 of FIG. 2B, or the like). The one or more physical ports 330 might include, without limitation, a first port 330a, a second port 330b, through an N$^{th}$ port 330n. When a client device 345 (among one or more client devices 345a-345n (collectively, "client devices 345")) communicatively couples to one of the physical ports 330—either via direct insertion of the client device 345 in the particular port, via wired connection to the particular port, or via wireless connection to the particular port—, a client driver 350 running on the host OS 325 or on the host computing system 310 might provide mapping between the single host OS 325 and the (single) particular client device 345 communicatively coupled to the (single) particular port 330.

In a virtual environment in which multiple virtual machines ("VMs") are running, however, the client driver 350 (at least by itself) would be ineffective in communicating with the particular client device 345 communicatively coupled to the particular port 330. This is because from the perspective of each VM of the multiple VMs, each VM might consider itself a "real" machine, and the various physical to virtual transport functions (such as shown and described above with respect to FIG. 2A) allows interconnection or interface between the VM and the physical resources of the host device, or physical resources of any client devices that are communicatively coupled to ports of the host device, to ensure that the VM functions in a manner that a "real" machine would. However, in a virtual environment, there is usually more than one VM in operation, and each VM has to share the resources of the host device with each of the other VMs running on the host computing system of the host device. In such a situation, conventional client drivers would be insufficient to provide the proper mapping for effectuating the interconnection or interface between the VM and the physical resources of the host device, or the physical resources of any client devices that are communicatively coupled to ports of the host device. In essence, neither any of the VMs nor the host computing system would know how to properly allocate resources of the host device to each VM, much less to properly allocate resources of any client devices that are communicatively coupled to the ports of the host device, even with the conventional client drivers installed. To overcome this problem, a VM-to-port peripheral device driver (such as VM-to-port peripheral device driver 135, as described herein with respect to FIGS. 1 and 4-6) may be installed on a host computing system to effectuate the proper mapping to allow proper resource allocation of the host device, or resource allocation of the client devices that are communicatively coupled to ports of the host device, to the multiple VMs running on the host computing system of the host device.

FIGS. 4A and 4B (collectively, "FIG. 4") are schematic diagrams illustrating a system 400 for implementing communications between two or more VMs and one or more client devices coupled to corresponding one or more ports via a VM-to-Port peripheral device driver, in accordance with various embodiments. The system 400 of FIG. 4 is an extension of the system 100 of FIG. 1, and descriptions of the system 100 of FIG. 1 similarly apply to the system 400 of FIG. 4. In FIG. 4, in addition to the host device 105, the host computing system 110, the virtual environment 115, the VMs 120, the VM OSs 125, the physical ports 130, and the virtual ports 140, system 400 further comprises one or more client devices 145 that are communicatively coupled to one or more of the physical ports 130. The one or more client devices 145 (also referred to as "peripheral appliances" or "peripheral devices"), in some embodiments, might include, without limitation, a small form factor pluggable ("SFP") device, an enhanced SFP ("SFP+") device, a compact SFP ("CSFP") device, a gigabit interface converter ("GBIC"), a universal serial bus ("USB") pluggable device, and/or the like. The client device, according to some embodiments, can be any physical device that can be plugged into a specific port, including, without limitation, a probe, a transponder, and/or the like. In some instances, at least one of the SFP device, the SFP+ device, or the CSFP device might include, but is not limited to, a SFP network interface device ("NID"), a SFP router, a SFP modem, or a SFP wireless access point, and/or any device that is providing a "host" virtualized layer via Network Functions Virtualization ("NFV"), or the like. SFP, SFP+, and CSFP devices comprise CPUs or processors that allow them to perform OAM functions (which are described below with respect to FIGS. 2B and 6). An example of a SFP NID is described in greater detail with respect to the '181 application, which has already been incorporated herein by reference in its entirety. In some cases, the USB pluggable device might include, without limitation, one of a printer, a scanner, a combination printer/scanner device, an external hard drive, a camera, a keyboard, a mouse, a drawing interface device, or a mobile device, and/or the like.

In FIG. 4, when it is determined that a client device 145 is communicatively coupled to a physical port 130—either via direct insertion of a client device in the particular port (e.g., in the case that the client device is a SFP device, a SFP+ device, a CSFP device, a GBIC, a USB pluggable device, or the like), via wired connection to the particular port, or via wireless connection to the particular port, and the like—the VM-to-Port peripheral device driver 135, when installed on the host computing system 110, might map each of the two or more VMs 120 with one or more functions of the client device 145 via corresponding each of the two or more virtual ports 140 associated with the particular physical port 130 to which the client device 145 is communicatively coupled. The VM-to-Port peripheral device driver 135 might then allocate, to each of the two or more VMs 120, resource usage times for the client device 145 that is communicatively coupled to the particular physical port 130. In some embodiments, allocating to each of the two or more VMs resource usage times for the client device might comprise scheduling, using the VM-to-port peripheral device driver 135, time slices to each of the two or more VMs during which each VM can use resources associated with the client device that is communicatively coupled to the particular physical port, as described in detail below with respect to FIGS. 5A and 5B.

With respect to FIGS. 5A and 5B (collectively, "FIG. 5"), schematic diagrams illustrate various methods 500 for scheduling or allocating resource time slices for a client device amongst two or more different VMs, in accordance with various embodiments. As shown in the embodiment of FIG. 5, a virtual environment 115 (which is similar, if not identical, to virtual environment 115 of FIGS. 1 and 4) might have running thereon a first VM 120a, a second VM 120b, through an $N^{th}$ VM 120n (which are similar, if not identical to the first VM 120a, the second VM 120b, through the $N^{th}$ VM 120n of FIGS. 1 and 4).

In some embodiments, schedulers, the host computing system 110, (perhaps, using the VM-to-Port peripheral device driver), or an orchestration agent (e.g., orchestration agent 235 of FIG. 2B) that is running on the host computing system 110 might "load share" the available schedule across the different VMs 120. Everything inside the virtual environment 115 is "virtual" and perceives time and utilization based on what "schedule" it is provided. To this end, it is important to realize that the VMs "being serviced" by the queue may not be serviced regularly, especially when higher priority activities occur (as described in detail with respect to FIG. 6 of the '952 application, which has already been incorporated herein by reference in its entirety). Optionally, there are a few ways to lock the schedule. One way might be to modify the host scheduling function in such a way that one particular VM (or more VMs) has the higher priority. Another way might be to modify the host drivers in such a way that the OAM and other time-based frames are not impacted by host scheduling (as also described in detail with reference to FIG. 6 of the '952 application).

As shown in the embodiment of FIG. 5, each VM 120a-120n is allocated a particular time slice of resource usage for the shared client device 145 (which is similar, if not identical, to client device 145 of FIGS. 1 and 4) or resource usage for devices controlled by the shared client device 145. In the non-limiting embodiment of FIG. 5A, each VM 120a-120n is provided with equal time slices of resource usage for the resources of the client device 145 (or resource usage for the resources of devices controlled by the shared client device 145) that repeat. As shown in FIG. 5A, the first VM-client time slice (or first set of VM-client time slices) 550a is depicted by blocks having diagonal line shading corresponding to similar shading in the block for the first VM 120a, while the second VM-client time slice (or second set of VM-client time slices) 550b is depicted by blocks having dark shading corresponding to similar shading in the block for the second VM 120b, and the $N^{th}$ VM-client time slice (or $N^{th}$ set of VM-client time slices) 550n is depicted by blocks having dotted shading corresponding to similar shading in the block for the $N^{th}$ VM 120n. The equal division of time slices for scheduling of the client device resources (or of resources of devices controlled by the shared client device 145) in the embodiment of FIG. 5A might be similar to processes such as time division multiplexing ("TDM") in the signal transmission context.

In alternative embodiments, rather than equal division of time slices (or TDM-like division) of the embodiment of FIG. 5A, each VM 120a-120n may be allocated a particular time slice of resource usage for the shared client device 145 (or resource usage for devices controlled by the shared client device 145), based on factors, including, but not limited to, operational capacity of each VM 120, historical or current resource usage rates by each VM 120, estimated resource usage for operations by each VM 120, and/or the like. As shown in the non-limiting embodiment of FIG. 5B, based on these factors (or other similar factors), the first VM 120a might be allocated a first VM-client time slice 505a that is greater than either the second VM-client time slice 505b or the $N^{th}$ VM-client time slice 505c, while the second VM 120b might be allocated a second VM-client time slice 505b that is less than either the first VM-client time slice 505a or the $N^{th}$ VM-client time slice 505c, and the $N^{th}$ VM 120n might be allocated an $N^{th}$ VM-client time slice 505c that is less than the first VM-client time slice 505a but greater than the second VM-client time slice 505b.

FIG. 6 is a flow diagram illustrating a method 600 for communications between two or more VMs and one or more client devices coupled to corresponding one or more ports via a VM-to-Port peripheral device driver, in accordance with various embodiments. In FIG. 6, the method 600 is described from the perspective of a single port amongst one or more ports of the host device, and accordingly is applicable to each of the one or more ports.

While the techniques and procedures are depicted and/or described in a certain order for purposes of illustration, it should be appreciated that certain procedures may be reordered and/or omitted within the scope of various embodiments. Moreover, while the method illustrated by FIG. 6 can be implemented by or with (and, in some cases, are described below with respect to) the systems 100, 200, 200', and 400 of FIGS. 1, 2A, 2B, and 4, respectively (or components thereof), such methods may also be implemented using any suitable hardware (or software) implementation. Similarly, while each of the systems 100, 200, 200', and 400 of FIGS. 1, 2A, 2B, and 4, respectively (or components thereof), can operate according to the method illustrated by FIG. 6 (e.g., by executing instructions embodied on a computer readable medium), the systems 100, 200, 200', and 400 of FIGS. 1, 2A, 2B, and 4 can each also operate according to other modes of operation and/or perform other suitable procedures.

In the embodiment of FIG. 6, method 600 might comprise, at block 605, configuring, with an orchestration agent (e.g., orchestration agent 235 of FIG. 2B) running on a host computing system (e.g., host computing system 110 of FIGS. 1, 2B, and 4) of a host device (e.g., host device 105 of FIGS. 1 and 4) and using a virtual-machine ("VM")-to-port peripheral device driver (e.g., VM-to-port peripheral device driver 135 of FIGS. 1 and 4), a physical port (e.g., physical port 130 of FIGS. 1 and 4) of the host device to establish two or more virtual ports (e.g., virtual ports 145 of FIGS. 1 and 4) that are associated with the physical port. At block 605, method 600 might comprise mapping, with the orchestration agent and using the VM-to-port peripheral device driver, each of two or more VMs running on the host computing system with corresponding each of the two or more virtual ports associated with the physical port (e.g., as shown and described with respect to FIG. 1).

Method 600, at block 615, might comprise determining whether a client device is communicatively coupled to the physical port—either via direct insertion of a client device in the particular port (e.g., in the case that the client device is a SFP device, a SFP+ device, a CSFP device, a GBIC, a USB pluggable device, or the like), via wired connection to the particular port, or via wireless connection to the particular port, and the like. If so, the method 600 proceeds to block

620. If not, the method loops back to block 615 until it is determined that a client device is communicatively coupled to the physical port.

At block 620, method 600 might comprise mapping, with the orchestration agent and using the VM-to-port peripheral device driver, each of the two or more VMs with one or more functions of the client device via corresponding each of the two or more virtual ports associated with the physical port to which the client device is communicatively coupled (e.g., as shown and described with respect to FIG. 4). Herein, the one or more functions of the client device might include, without limitation, at least one of an activation function, an operation function, a deletion function, a specialized function, or an operations, administration, and management ("OAM") function, and/or the like. According to some embodiments, the orchestration agent might be an orchestrator in a host layer of the host computing system that controls the host computing system and enables peripheral device configuration for enabling the one or more functions of the client device to be mapped to each of the two or more VMs. In some embodiments, the "Host OS" and any "orchestrators" controlling the host configurations might provide the users with information on "inventory," "state," and mapping of peripheral clients as part of the host and orchestration system mapping, performance monitoring, usage, and other typical host and Orchestrator Operational, Administration, and Accounting functions, logs, portals, and other system and OS mechanisms.

According to some embodiments, method 600 might further comprise allocating—with the orchestration agent, using the VM-to-port peripheral device driver, and to each of the two or more VMs—resource usage times for the client device that is communicatively coupled to the physical port (block 625), which, in some embodiments might comprise scheduling, with the orchestration agent and using the VM-to-port peripheral device driver, time slices to each of the two or more VMs during which each VM can use resources associated with the client device that is communicatively coupled to the physical port (block 630), in a manner similar to that as described with respect to FIGS. 5A and 5B.

Merely by way of example, in some embodiments, method 600 might further comprise, at block 635, receiving, at least one of the two or more VMs, one or more OAM frames from the client device via the corresponding virtual port(s). In some cases, the one or more OAM frames might be received by a VM management agent (such as VM management agent 245 of FIG. 2B). Other OAM functionality that may be implemented are described in detail in the '952, '085, and '000 applications, which have already been incorporated herein by reference in their entirety. Method 600 might further comprise receiving, at the client device, at least one of activation instructions, operation instructions, deletion instructions, and/or specialized instructions from at least one of the two or more VMs via the corresponding virtual port(s) (block 640). As described above, activation instructions might include instructions from a VM to the client device to activate the client device itself or to activate one or more functions or hardware associated with the client device (either as part of the client device or separate from yet controlled by the client device), while the operation instruction might include instructions from the VM to the client device to perform one or more operations (or to instruct a separate device that is controlled by the client device to perform one or more operations), and the deletion instruction might include instructions from the VM to the client device to delete one or more programs, one or more software applications ("apps"), one or more data files, and/or one or more virtual network functions ("VNFs") that are stored on the client device itself or stored on a device controlled by the client device, or the like. In some embodiments, the client device (or a device controlled by the client device) might possess one or more specialized functions (e.g., specialized processing functions, specialized memory functions, specialized network functions, specialized hardware functions, and/or the like). In such embodiments, the specialized instructions might include instructions from the VM to the client device to perform one or more specialized functions (or to instruct a separate device that is controlled by the client device to perform one or more specialized functions). One example of a specialized function is in the context of network pluggable network interface device ("NID") technology (such as a SFP NID, as described above with respect to FIG. 4 and as described in detail in the '181 application. A SFP NID, or the like, typically has one or more maintenance entities ("MEs") or one or more maintenance end points ("MEPs") thereon that perform Performance and/or Fault Isolation roles, or the like. The one or more MEs or one or more MEPs manage themselves and each has its own OS, and thus are generally not configured to work with a router or switch OS (i.e., OS of a network host device) as a peripheral device or client device. The VM-to-port peripheral device driver, as described herein, provides a way for the MEs or MEPs to work with a router or switch OS (or OS of other network element-type host device), even if the SFP NID is being used as a client device that is communicatively coupled to a physical port of the host device (e.g., router, switch, or other network element-type host device). Typically, the maintenance function (of the MEs or MEPs) is very small, but very, very fast (in real time), so that in order to virtualize this function, it is conventionally required to buy very high end computers, but such high end computers are typically replaced every 1 to 1.5 years, thereby making this approach economically ineffective. To solve this, the VM-to-port peripheral device driver may be used to change the host device (including, e.g., the physical ports, the host computing system, and/or the like) and/or to change the peripheral appliance (e.g., the client device) so that they can be used with the maintenance function (i.e., MEs or MEPs) of a SFP NID or the like, which allows low cost computer to be used with the peripheral appliances.

In some embodiments, even if a particular VM dies, crashes, or has otherwise been rendered inoperable (or if a network host device such as a virtualized router or virtualized switch is put into a "suspend" state, in which case remote troubleshooting to a ME or a MEP on the particular network host device becomes impossible), the host computing system 110 (or the orchestration agent or the like) might provide—via the configuration of the physical ports 130 and the mapping of virtual ports to the physical ports (when the VM-to-Port peripheral device driver 135 is installed on the host computing system 110)—at least one signal to the affected physical port(s) and/or to the affected client device(s) (or remote troubleshooting network elements or the like) that is(are) communicatively coupled to the affected physical port(s) indicating that the communication path between the host computing system 110 and the affected physical port(s) is still up, operation, or otherwise good (despite the particular VM having died, crashed, or otherwise been rendered inoperable (or that the virtualized router or virtualized switch has put into a "suspend" state).

At block 645, method 600 might comprise determining whether the client device has been decoupled from the physical port—either physically extracted from the particular port (e.g., in the case that the client device is a SFP device, a SFP+ device, a CSFP device, a GBIC, a USB pluggable device, or the like), wired connection disconnected from the particular port, or wireless connection disconnected from the particular port. If so, the method 600 returns to block 615. If not, the method loops back to block 635.

Exemplary System and Hardware Implementation

Figure 7:
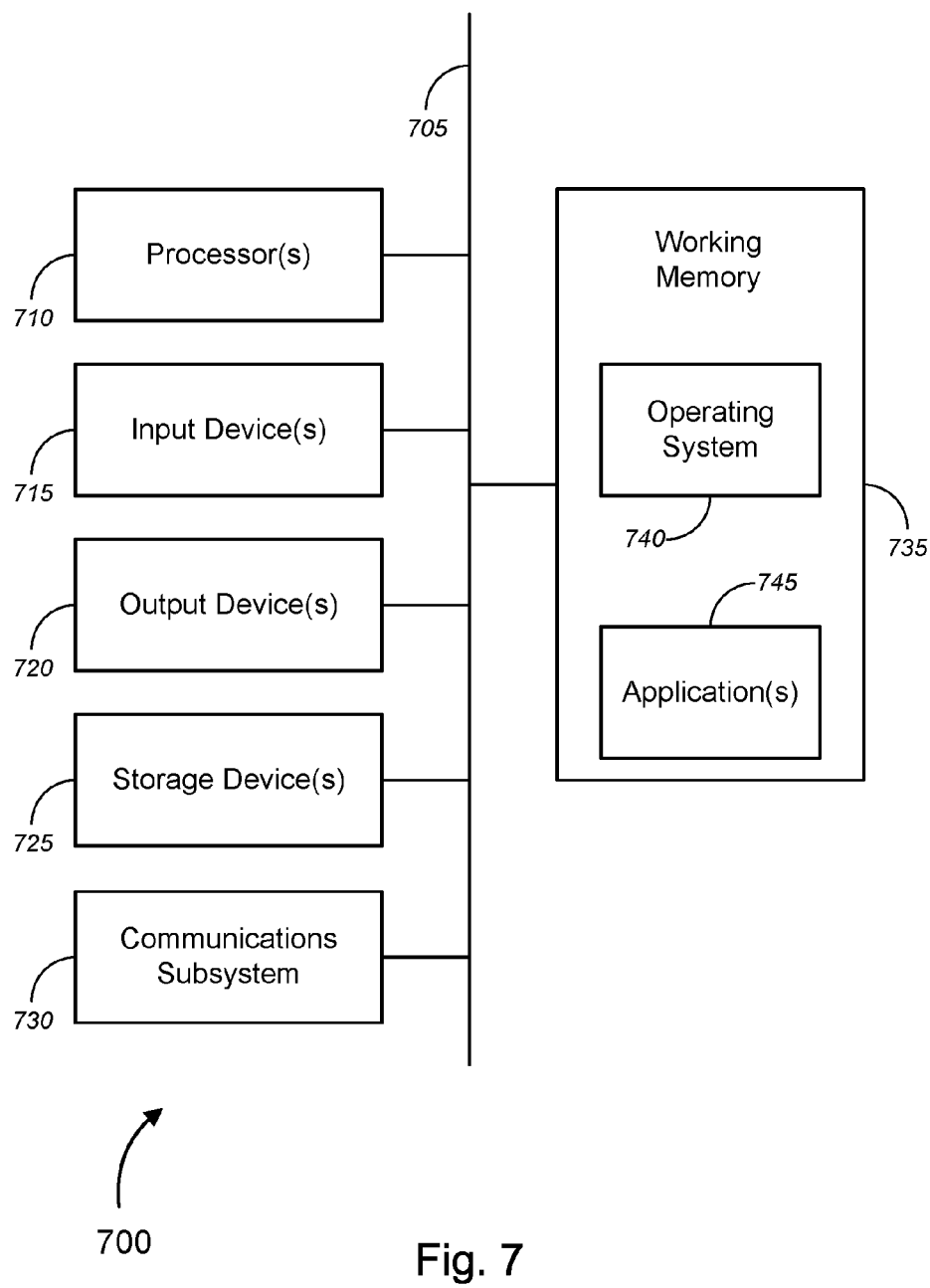
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., host computing system 110), or of any other device (e.g., client device 145, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., host computing system) 110, or of any other device (e.g., client device 145, etc.), described above with respect to FIGS. 1, 4, and 5—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like); one or more input devices 715, which can include, without limitation, a mouse, a keyboard and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    configuring, with an orchestration agent running on a host computing system of a host device and using a virtual-machine ("VM")-to-port peripheral device driver, each physical port of a plurality of physical ports of the host device to establish two or more virtual ports that are associated with each physical port, wherein each physical port is a port for connecting to at least one of a peripheral device or an external device; and
    mapping, with the orchestration agent and using the VM-to-port peripheral device driver, each of two or more VMs running on the host computing system with a corresponding one of the two or more virtual ports associated with each physical port of the plurality of physical ports, wherein each VM is mapped to each corresponding virtual port associated with each physical port, wherein the virtual port that is mapped to each VM is separate from the virtual ports that are mapped with other VMs running on the host computing system and that are associated with the same physical ports, wherein the VM-to-port peripheral device driver is a driver for the plurality of physical ports, the two or more virtual ports that are associated with each physical port, and the two or more VMs,
    wherein, when a client device is communicatively coupled to a particular physical port of the plurality of physical ports, mapping each of the two or more VMs with a corresponding one of the two or more virtual ports associated with the particular physical port comprises mapping, with the orchestration agent and using the VM-to-port peripheral device driver, each of the two or more VMs with one or more functions of the client device via a corresponding one of the two or more virtual ports associated with the particular physical port to which the client device is communicatively coupled, wherein the one or more functions of the client device comprise one or more management-related functions.

2. The method of claim 1, wherein the one or more functions of the client device comprise at least one of an activation function, an operation function, a deletion function, a specialized function, or an operations, administration, and management ("OAM") function.

3. The method of claim 1, wherein the orchestration agent is an orchestrator in a host layer of the host computing system that controls the host computing system and enables peripheral device configuration for enabling the one or more functions of the client device to be mapped to each of the two or more VMs.

4. The method of claim 1, further comprising:
allocating, with the orchestration agent, using the VM-to-port peripheral device driver, and to each of the two or more VMs, resource usage times for the client device that is communicatively coupled to the particular physical port.

5. The method of claim 4, wherein allocating to each of the two or more VMs resource usage times for the client device comprises scheduling, with the orchestration agent and using the VM-to-port peripheral device driver, time slices to each of the two or more VMs during which each VM can use resources associated with the client device that is communicatively coupled to the particular physical port.

6. The method of claim 1, wherein the client device is a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device.

7. The method of claim 6, wherein at least one of the SFP device, the SFP+ device, or the CSFP device comprises at least one of a SFP network interface device ("NID"), a SFP router, a SFP modem, or a SFP wireless access point.

8. The method of claim 6, wherein the USB pluggable device comprises one of a printer, a scanner, a combination printer/scanner device, an external hard drive, a camera, a keyboard, a mouse, a drawing interface device, or a mobile device.

9. The method of claim 1, wherein the host device is a device selected from a group consisting of a router, a switch, a network element, a demarcation device, a WiFi device, a kernel-based virtual machine ("KVM")-based host machine, an ESX-based host machine, and an ESXi-based host machine.

10. The method of claim 1, wherein the VM-to-port peripheral device driver is a virtual network function ("VNF").

11. A host device, comprising:
a plurality of physical ports;
a host computing system, comprising:
at least one processor;
at least one non-transitory computer readable medium communicatively coupled to the at least one processor, the at least one non-transitory computer readable medium having stored thereon computer software comprising a set of instructions that, when executed by the at least one processor, causes the host computing system to:
configure, using a virtual-machine ("VM")-to-port peripheral device driver, each physical port of the plurality of physical ports to establish two or more virtual ports that are associated with each physical port, wherein the physical port is a port for connecting to at least one of a peripheral device or an external device; and
map, using the VM-to-port peripheral device driver, each of two or more VMs running on the host computing system with a corresponding one of the two or more virtual ports associated with each physical port of the plurality of physical ports, wherein each VM is mapped to each corresponding virtual port associated with each physical port, wherein the virtual port that is mapped to each VM is separate from the virtual ports that are mapped with other VMs running on the host computing system and that are associated with the same physical ports, wherein the VM-to-port peripheral device driver is a driver for the plurality of physical ports, the two or more virtual ports that are associated with each physical port, and the two or more VMs,
wherein, when a client device is communicatively coupled to a particular physical port of the plurality of physical port, mapping each of the two or more VMs with a corresponding one of the two or more virtual ports associated with each physical port comprises mapping, using the VM-to-port peripheral device driver, each of the two or more VMs with one or more functions of the client device via a corresponding one of the two or more virtual ports associated with the particular physical port to which the client device is communicatively coupled, wherein the one or more functions of the client device comprise one or more management-related functions.

12. The host device of claim 11, wherein the one or more functions of the client device comprise at least one of an activation function, an operation function, a deletion function, a specialized function, or an operations, administration, and management ("OAM") function.

13. The host device of claim 11, wherein the host computing system comprises an orchestrator in a host layer of the host computing system, and wherein the orchestrator controls the host computing system and enables peripheral device configuration for enabling the one or more functions of the client device to be mapped to each of the two or more VMs.

14. The host device of claim 11, wherein the set of instructions, when executed by the at least one processor, further causes the host computing system to:
allocate, using the VM-to-port peripheral device driver and to each of the two or more VMs, resource usage times for the client device that is communicatively coupled to the particular physical port.

15. The host device of claim 14, wherein allocating to each of the two or more VMs resource usage times for the client device comprises scheduling, using the VM-to-port peripheral device driver, time slices to each of the two or more VMs during which each VM can use resources associated with the client device that is communicatively coupled to the particular physical port.

16. The host device of claim 11, wherein the client device is a device selected from a group consisting of a small form factor pluggable ("SFP") device, an enhanced SFP ("SFP+") device, a compact SFP ("CSFP") device, a gigabit interface converter ("GBIC"), and a universal serial bus ("USB") pluggable device.

17. The host device of claim 16, wherein at least one of the SFP device, the SFP+ device, or the CSFP device comprises a SFP network interface device ("NID"), a SFP router, a SFP modem, or a SFP wireless access point.

18. The host device of claim 16, wherein the USB pluggable device comprises one of a printer, a scanner, a combination printer/scanner device, an external hard drive, a camera, a keyboard, a mouse, a drawing interface device, or a mobile device.

19. The host device of claim 11, wherein the host device is a device selected from a group consisting of a router, a switch, a network element, a demarcation device, a WiFi device, a kernel-based virtual machine ("KVM")-based host machine, an ESX-based host machine, and an ESXi-based host machine.

20. The host device of claim 11, wherein the VM-to-port peripheral device driver is a virtual network function ("VNF").

* * * * *